US007413118B2

(12) United States Patent

Kim

(10) Patent No.: US 7,413,118 B2

(45) Date of Patent: Aug. 19, 2008

(54) FINANCIAL AUTOMATED-TELLER MACHINE AND METHOD OF WITHDRAWING CASSETTE PROVIDED THEREIN

(75) Inventor: Youn Jong Kim, Uiwang-Si (KR)

(73) Assignee: Nautilus Hyosung Inc., Seoul (KR)

( * ) Notice: Subject to any disclaimer, the term of this patent is extended or adjusted under 35 U.S.C. 154(b) by 291 days.

(21) Appl. No.: 11/201,284

(22) Filed: Aug. 11, 2005

(65) Prior Publication Data

US 2006/0202026 A1 Sep. 14, 2006

(30) Foreign Application Priority Data

Mar. 11, 2005 (KR) ...................... 10-2005-0020450

(51) Int. Cl.
*G06Q 40/00* (2006.01)

(52) U.S. Cl. ...................................... 235/379; 235/381

(58) Field of Classification Search ................. 235/379, 235/383, 381
See application file for complete search history.

(56) References Cited

U.S. PATENT DOCUMENTS

| | | | | |
|---|---|---|---|---|
| 5,483,047 | A * | 1/1996 | Ramachandran et al. | 235/379 |
| 6,082,616 | A * | 7/2000 | Lewis et al. | 235/379 |
| 6,527,172 | B1 * | 3/2003 | Lewis et al. | 235/379 |
| 7,063,316 | B2 * | 6/2006 | Graef et al. | 271/162 |
| 7,143,933 | B2 * | 12/2006 | Uematsu et al. | 235/379 |
| 7,152,784 | B2 * | 12/2006 | Douglass et al. | 235/379 |
| 7,175,075 | B2 * | 2/2007 | Magee et al. | 235/379 |

* cited by examiner

*Primary Examiner*—Ahshik Kim
(74) *Attorney, Agent, or Firm*—Fish & Richardson P.C.

(57) ABSTRACT

The present invention provides a financial automated-teller machine comprising a main body having an operation unit and a cash deposit/withdrawal unit installed at a front face thereof; a safety door having a locking function and hingedly connected to an edge of the front face of the main body; a safe that is disposed within the main body and is opened and closed by means of the safety door; a bill storage unit with a bill-receiving and dispensing function for allowing a deposited bill to be received therein and a bill to be withdrawn to be dispensed therefrom; and a base that has the bill storage unit mounted thereon, is placed within the safe when the safety door is closed, can be withdrawn to the outside of the safe when the safety door is opened, and is provided with a first guide at a lower portion thereof so that the base can be withdrawn along the first guide. Thus, a maintenance work, particularly, a replacement work for the bill storage unit can be easily performed in an inner working space of a kiosk which is narrow in a fore and aft direction, and the maintenance work does not cause inconvenience to travelling cars or walkers. The present invention further provides a method of withdrawing a cassette provided in the automated-teller machine.

16 Claims, 12 Drawing Sheets

FINANCIAL AUTOMATED-TELLER MACHINE AND METHOD OF WITHDRAWING CASSETTE PROVIDED THEREIN

BACKGROUND OF THE INVENTION

1. Field of the Invention

The present invention relates to a financial automated-teller machine for unmanned financial transactions, and more particularly, to a wall-type financial automated-teller machine, in which an operation unit and a cash deposit/withdrawal unit are provided on an outer surface of a wall of a building, so that anyone can conveniently perform financial transactions through the financial automated-teller machine at the roadside as in the use of a vending machine.

2. Description of the Related Art

Generally, an automated-teller machine is used by banks or other financial institutions in order to provide a convenient banking service to their customers. The automated-teller machine is installed in convenience stores or public places in addition to the premises of the banks or financial institutions, and is configured such that customers can deposit or withdraw cash money conveniently whenever needed, using a cash card or a credit card. Recently, in addition to the money deposit and withdrawal to and from financial institutions, an automated-teller machine has expanded its use and provides a variety of additional services such as insurance bill payment, tax payment, monthly deposit for installment savings, deposit and withdrawal for a time deposit or the like, provision of information, and various official reports. A wall-type automated-teller machine has been proposed so as to enable financial transactions in the street.

The wall-type automated-teller machine is constructed such that an operation panel and a cash deposit/withdrawal unit are exposed on an outer wall surface of a building and thus a user can be provided with a banking service conveniently in the street. This wall-type automated-teller machine (hereinafter, referred to as an "ATM") is provided with an operation panel and a cash deposit/withdrawal unit exposed to the outside of a building so that a user can utilize it while walking on a street. In a case where the ATM is installed in a roadside building, a car passenger can use the ATM directly without getting off from the car. In addition, in case of the use of some national or local roads with no buildings or constructions at the roadside, a kiosk may be built at the roadside and an ATM is installed inside the kiosk, thus enabling financial transactions while traveling such roads. In particular, the United States with a long distance between the cities has many kiosks built along the inter-city roads. The kiosk tends to be standardized, or kiosk-exclusive ATMs have been developed and manufactured.

U.S. Pat. No. 4,649,832 discloses an ATM for use in a kiosk, which will be described with reference to the accompanying drawings.

FIG. 1 is a perspective view showing a kiosk installed at the roadside. The kiosk 10 is provided with a lockable door 11 and an ATM 20 is accommodated and installed inside the kiosk 10.

FIG. 2 is a perspective view of a conventional ATM to be installed within a kiosk. FIG. 3 is a cross-sectional view showing a safe of the ATM installed within the kiosk. FIG. 4 is a cross-sectional view showing a state where a safety door of the ATM is opened.

As shown in the figures, the ATM 20 comprises a main body 21, an operation unit 22*a* and a cash deposit/withdrawal unit 22*b* that are installed in a face 21*a* of the main body 21 so as to be exposed to the roadside, a safety door 24 having a locking function 23 and hingedly-connected to a lateral end of the face 21*a* where the operation unit 22*a* and the cash deposit/withdrawal unit 22*b* are installed, a safe 25 (FIG. 3) to be opened and closed by the safety door 24, a bill storage unit 26 (FIG. 3) disposed within the safe 25 with the safety door 24 closed, and a bill-receiving/dispensing unit 27 (FIG. 3) for allowing a deposited bill to be received into the bill storage unit 26 and a bill to be withdrawn to be dispensed from the bill storage unit 26.

The kiosk 10 is composed of a plurality of walls 13 to form a desired working space 12 therein, and a front wall 13*a* of the walls 13 facing a road is provided with the operation unit 22*a* and the cash deposit/withdrawal unit 22*b* of the ATM as described above. A door 11 is formed in a lateral wall 13*b* perpendicular to the front wall 13*a* of the kiosk 10 so that a clerk can have access to the working space 12 therethrough. The working space 12 is provided with a curved wall 14 that pivots together with the safety door 24 of the ATM 20. At this time, the curved wall 14 is formed integrally with a portion of the front wall 13*a* and thus pivots together with the safety door 24 when the safety door is opened and closed. If the safety door 24 is fully opened, a portion of the curved wall 14 becomes perpendicular to the front wall 13*a*, as shown in FIG. 4. When the safety door 24 is fully opened, a part 15 occupied by the curved wall 14 in the working space 12 becomes clear, thereby enabling the clerk to perform works (replacement and maintenance works of the bill storage unit) in a wider working space.

However, in case of the conventional ATM 20, since the bill storage unit 26 is released only in a direction designated by an arrow in FIG. 4, the safety door 24 should be fully opened and the curved wall 14 should protrude beyond the front wall 13*a*. Thus, a collision accident with a traveling car may occur, and a replacement work for the bill storage unit 26 cannot be easily performed in the working space 12 that is narrow in a fore and aft direction.

SUMMARY OF THE INVENTION

The present invention is conceived to solve the aforementioned problems in the prior art. An object of the present invention is to provide a financial automated-teller machine, wherein a maintenance work, particularly, a replacement work for a bill storage unit can be easily performed even in a working space of a kiosk, which is narrow in a fore and aft direction, and the maintenance work does not cause inconvenience to travelling cars or walkers, and to provide a method of withdrawing a cassette provided in the automated-teller machine.

A financial automated-teller machine according to the present invention for achieving the object comprises a main body having an operation unit and a cash deposit/withdrawal unit installed at a front face thereof, a safety door having a locking function and hingedly connected to an edge of the front face of the main body; a safe that is disposed within the main body and is opened and closed by means of the safety door; a bill storage unit with a bill-receiving and dispensing function for allowing a deposited bill to be received therein and a bill to be withdrawn to be dispensed therefrom; and a base that has the bill storage unit mounted thereon, is placed within the safe when the safety door is closed, can be withdrawn to the outside of the safe when the safety door is opened, and is provided with a first guide at a lower portion thereof so that the base can be withdrawn along the first guide. The first guide is installed at a predetermined angle with respect to the front face of the main body.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the present invention will be described in detail with reference to the accompanying drawings.

Figure 1:
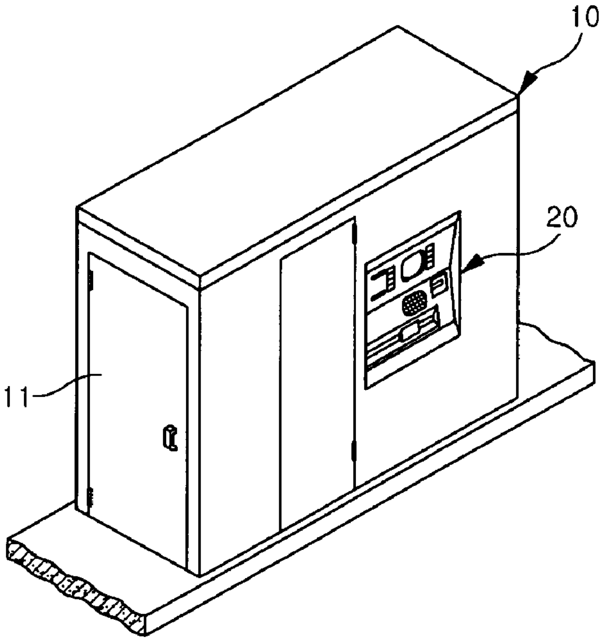
FIG. 1 is a perspective view showing a kiosk installed at the roadside.
Figure 2:
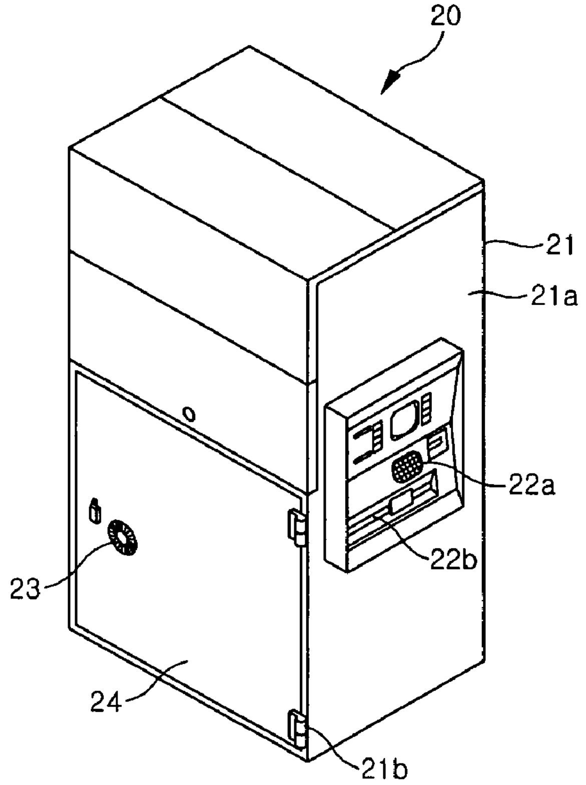
FIG. 2 is a perspective view of a conventional ATM to be installed within a kiosk.
Figure 3:
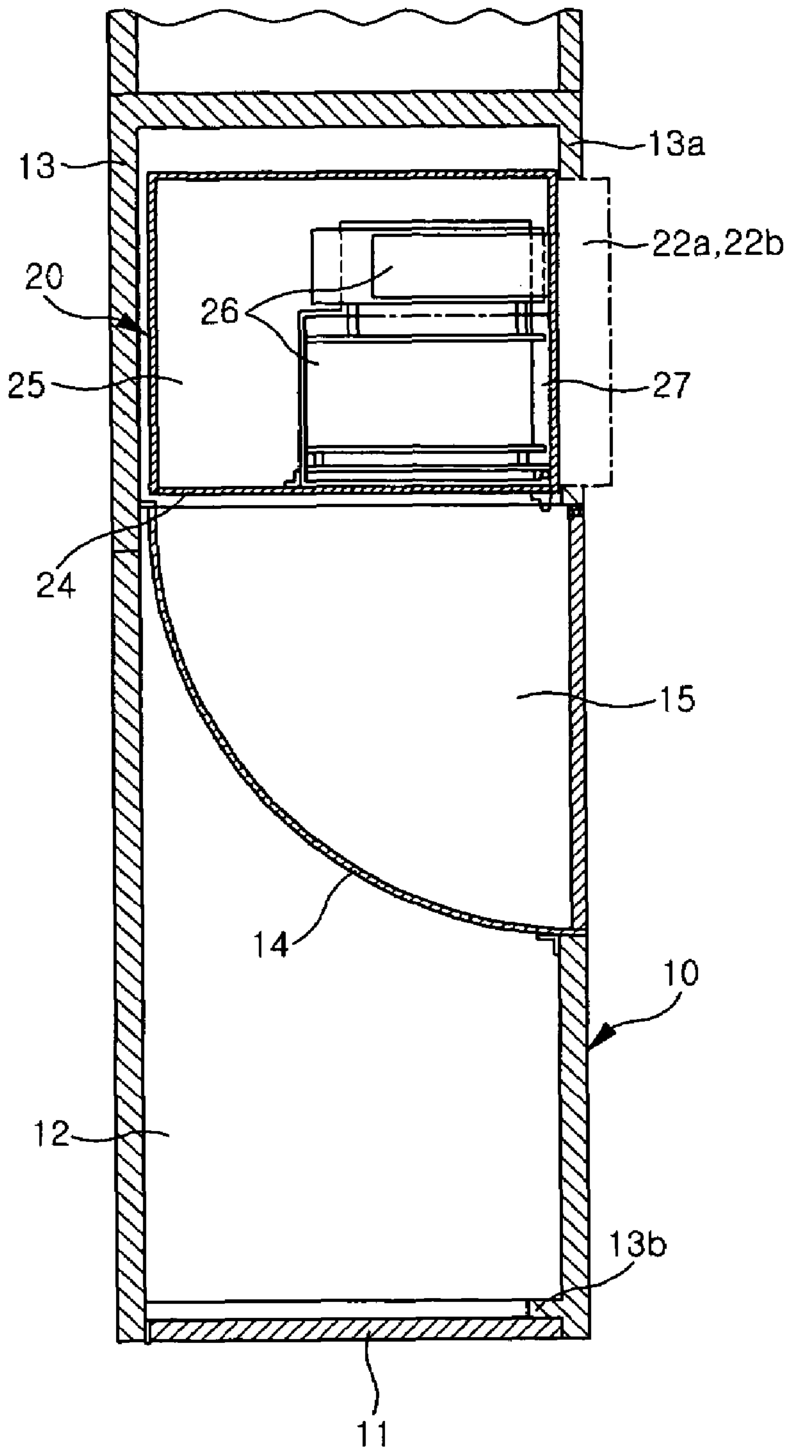
FIG. 3 is a cross-sectional view showing a safe of the ATM installed within the kiosk.
Figure 4:
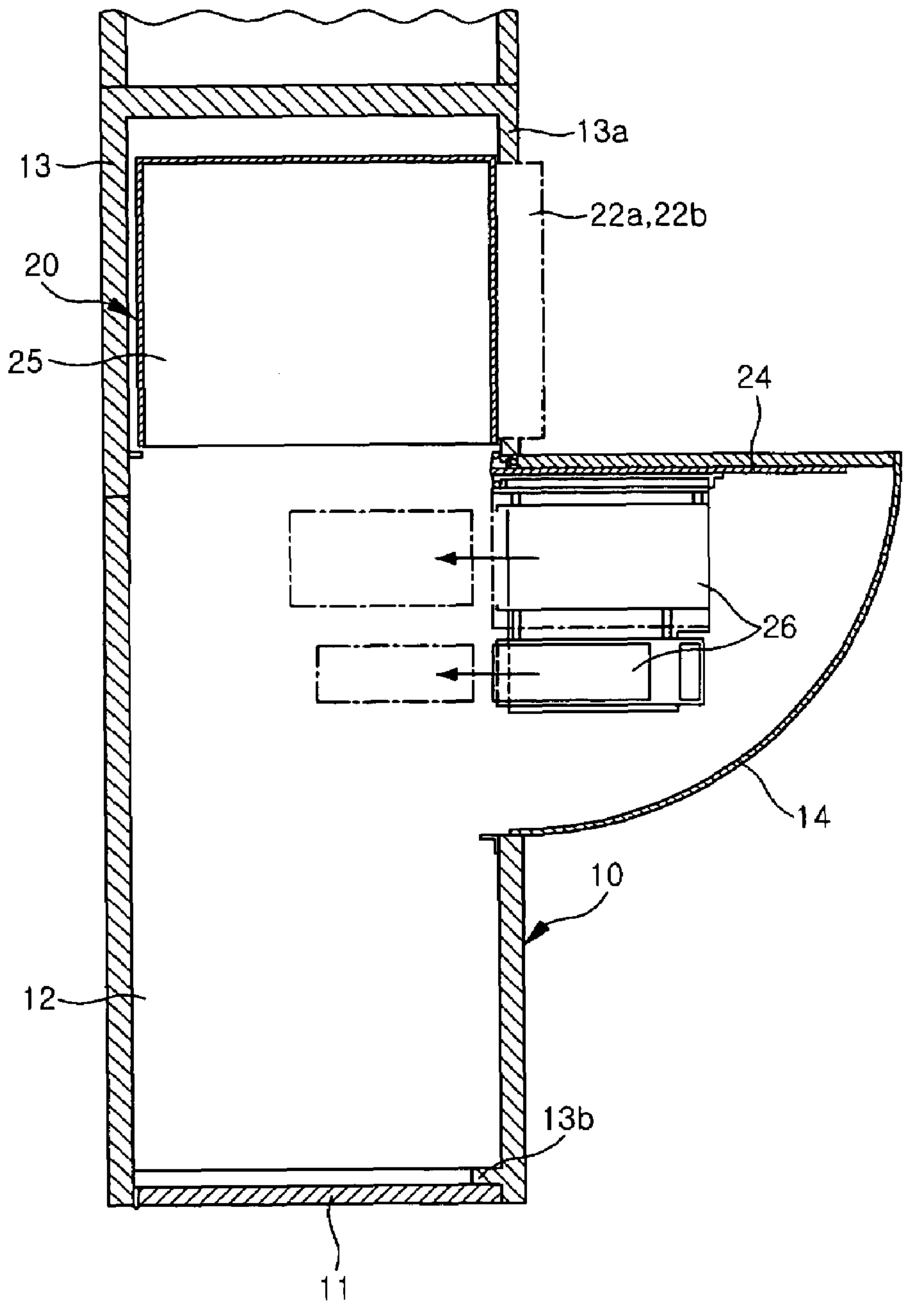
FIG. 4 is a cross-sectional view showing a state where a safety door of the ATM is opened.
Figure 5:
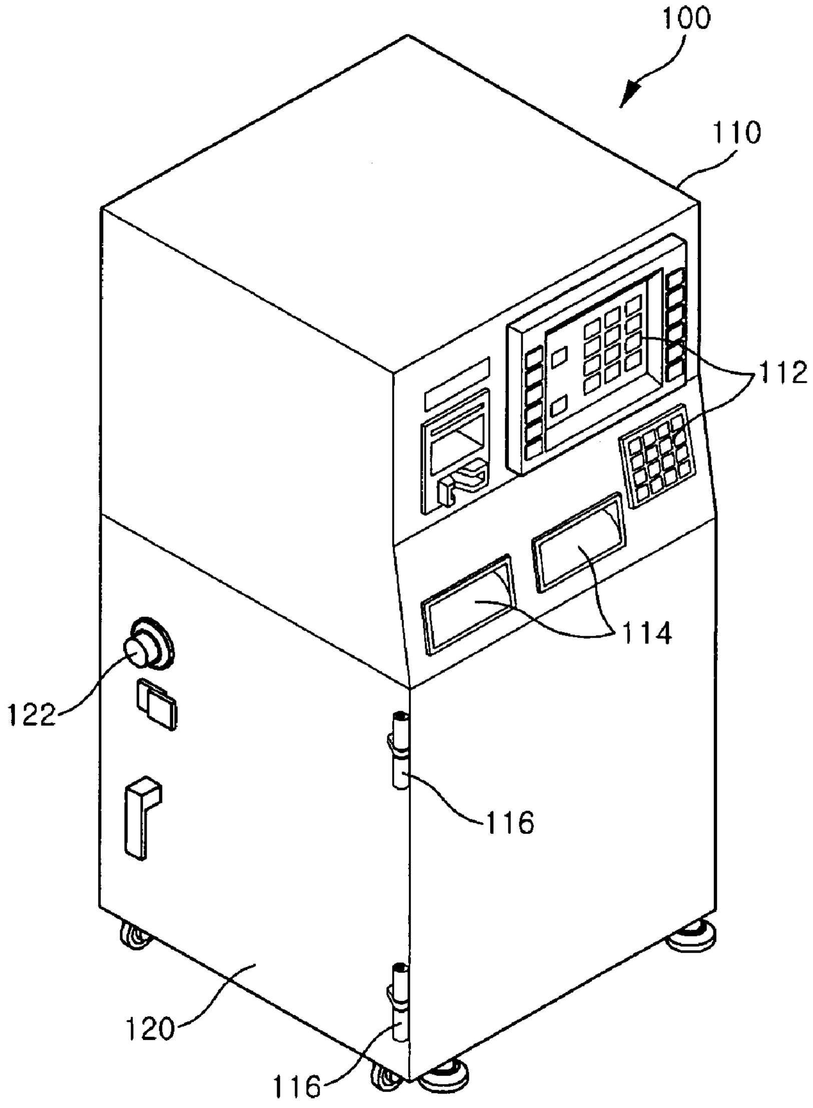
FIG. 5 is a perspective view of a financial automated-teller machine according to the present invention.

FIG. 5 is a perspective view of a financial automated-teller machine according to the invention. The financial automated-teller machine (ATM) 100 of the present invention comprises a main body 110 having a rectangular shape as in typical ATMs, and is provided with an operation unit 112 and a cash deposit/withdrawal unit 114 at a front face thereof. One lateral face of the main body 110 is provided a safety door 120 capable of opening and closing the interior of the main body 110. The safety door 120 has a locking function 122 so that other people except clerks cannot open the safety door 120. On the other hand, the safety door 120 is constructed to be opened pivotably on a hinge 116 that is provided at one lateral edge of the front face of the main body 110.

Figure 6:
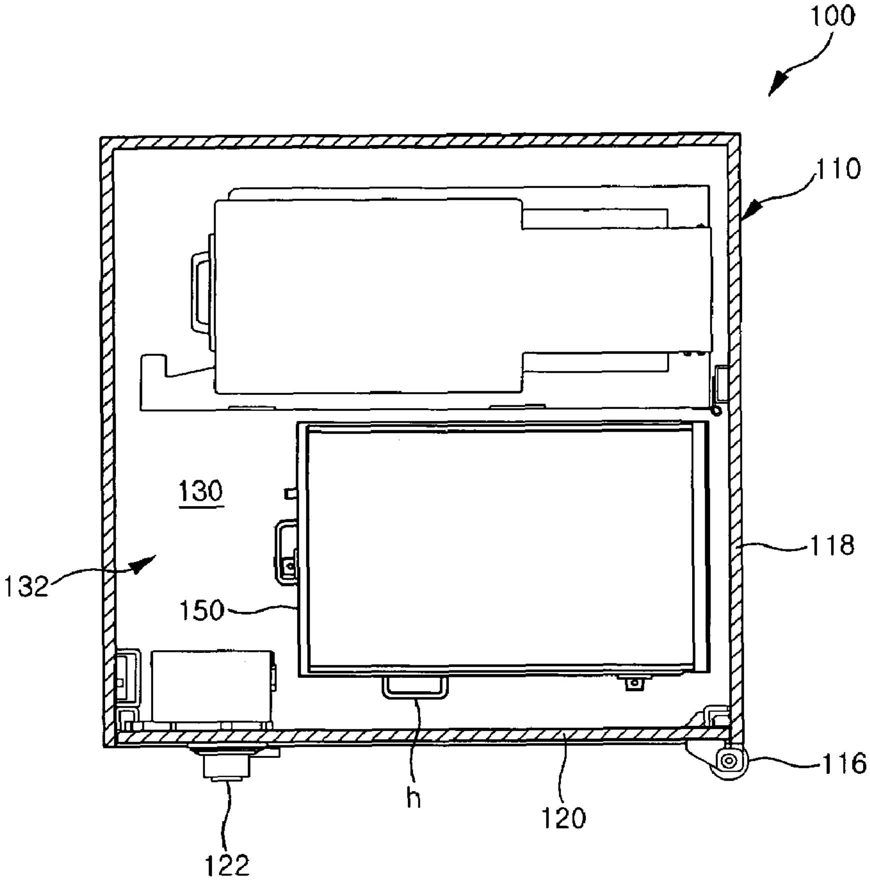
FIG. 6 is a cross-sectional view of FIG. 5.
Figure 7:
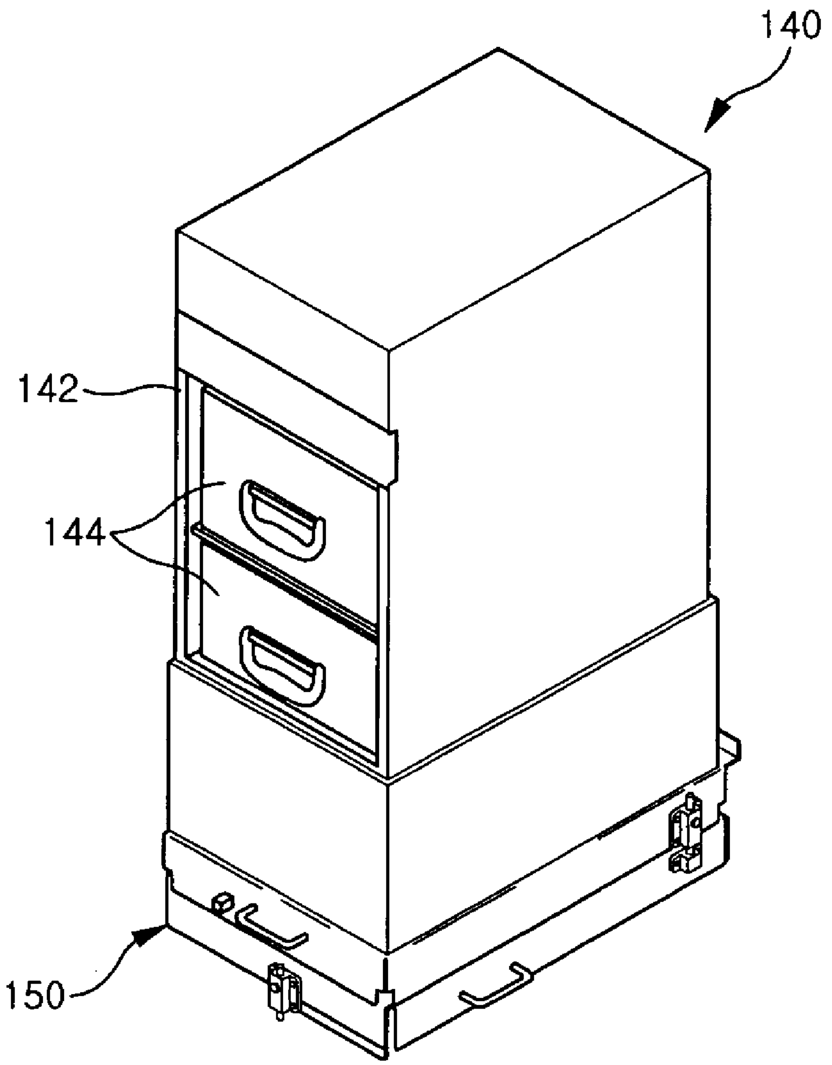
FIG. 7 is a perspective view showing a bill storage unit provided within the ATM.
Figure 8:
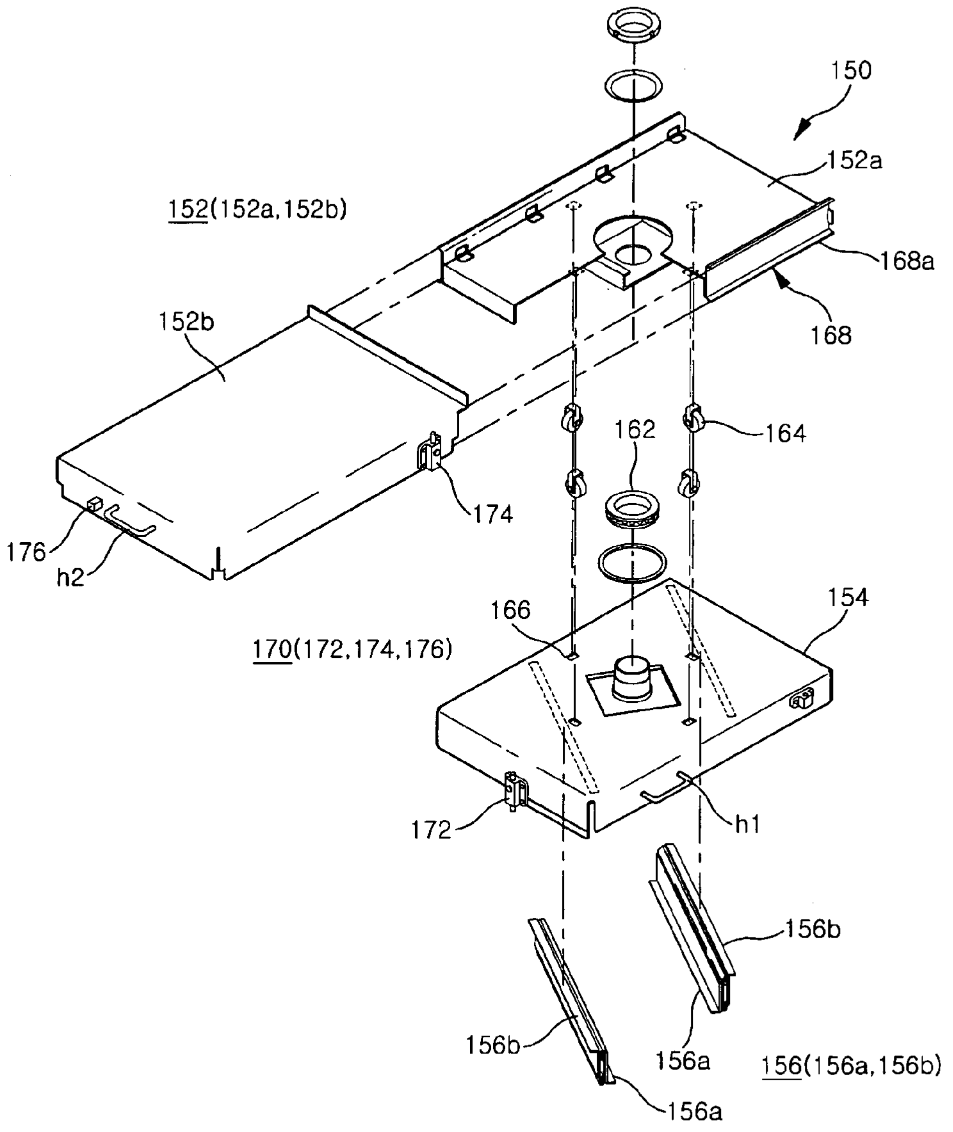
FIG. 8 is an exploded perspective view of a base provided at the bottom of the bill storage unit.

FIG. 6 is a cross-sectional view of FIG. 5, FIG. 7 is a perspective view showing a bill storage unit provided within the ATM, and FIG. 8 is an exploded perspective view of a base provided at the bottom of the bill storage unit.

Referring to these figures, the interior of the main body 110 to be opened and closed by the safety door 120 is provided with a safe 130 constructed of a certain space. The safe 130 is provided with a bill storage unit 140 for accommodating a bill deposited or to be withdrawn through the cash deposit/withdrawal unit 114 (FIG. 5). A base 150 is disposed at a lower portion of the bill storage unit 140, i.e., between a bottom face of the bill storage unit 140 and a floor face 132 of the safe 130. As illustrated in FIG. 7, the bill storage unit 140 comprises a frame 142 and a plurality of cassettes 144 coupled to the frame 142.

The base 150 is used to withdraw the bill storage unit 140 to the outside of the safe 130 upon replacement of the cassettes 144 or maintenance of the ATM 100. The base 150 comprises a rotary plate 152 connected to the bottom face of the frame 142 of the bill storage unit 140, a fixed plate 154 coupled to the bottom of the rotary plate 152, and first guides 156 disposed between the bottom face of the fixed plate 152 and the floor face 132 of the safe 130. In addition, the fixed plate 154 is provided with a handle h1 at a lateral face thereof so that the base 150 can be easily withdrawn.

Each of the first guide 156 comprises a guide rail 156*a* fixed on the floor face 132 of the safe 130 and a guide block 156*b* fixed to the bottom face of the fixed plate 154 so as to move along the guide rail 156*a*. The first guides 156 are installed at a predetermined angle with respect to a front wall 118 of the main body 110 (FIG. 6) such that a wall of the kiosk does not interfere with the frame 142 of the bill storage unit 140 upon withdrawal of the bill storage unit 140. An optimum angle for avoiding the interference is about 30° with respect to the front wall 118 (FIG. 6).

The rotary plate 152 is coupled to the fixed plate 154 by means of a bearing 162. As to the bearing 162, a thrust bearing capable of supporting the weight of the bill storage unit 140 is used. The rotary plate 152 is provided with a plurality of rollers 164 at the bottom face thereof, so that it can be easily rotated. Seating recesses 166 into which portions of the rollers 164 are inserted are formed on a top face of the fixed plate 154 so that the rotary plate 152 can be fixed at certain positions. At this time, the seating recesses 166 are formed on a path of rotation of the rollers 164 in such a manner that four seating recesses 166 are formed equiangularly, thereby enabling the rotary plate 152 to be fixed at every 90°.

Meanwhile, the rotary plate 152 comprises a rotary member 152*a* placed above the fixed plate 154 and a slider member 152*b* sliding over the rotary member 152*a* along second guides 168 provided at lateral faces of the rotary member 152*a*, so that a clerk can further withdraw the bill storage unit 140 toward him/her. Each of the second guide 168 comprises a guide rail 168*a* for guiding the withdrawal direction of the slider member 152*b*, and a guide block (not shown) mounted on an inner surface of the slider member 152*b* to move along the guide rail 168*a*. The slider member 152*b* is provided with a handle h2 at a rear face thereof so that the rotation of the rotary plate 152 and the withdrawal of the slider member 152*b* can be easily carried out.

In order to prevent the bill storage unit 140 from arbitrarily moving within the safe 130, the base 150 is further provided with a fixing member 170. The fixing member 170 comprises a first fixing member 172 for preventing the play of the base 150, a second fixing member 174 for preventing the play of the rotary plate 152, and a third fixing member 176 for preventing the play of the slider member 152*b*. At this time, the first fixing member 172 is mounted on the fixed plate 154 so as to fix the base 150 to the floor face 132 of the safe 130. Accordingly, the base 150 is prevented from arbitrarily playing along the first guide 156. The second fixing member 174 is mounted on the slider member 152*b* to fix the rotary plate 152 to the fixed plate 154, thereby preventing the rotary plate 152 from being arbitrarily rotated. In addition, the third fixing member 176 is mounted on the slider member 152*b* to fix it to the rotary member 152*a*, thereby preventing the slider member 152*b* from arbitrarily playing along the second guide 168.

In the ATM constructed as above, the procedure for withdrawing a cassette provided in the ATM comprises the steps of: opening the safety door to open the safe provided within the main body; withdrawing the bill storage unit, which includes a plurality of cassettes and is accommodated in the safe, at a predetermined angle with respect to the front face of the main body; rotating the handle of the bill storage unit, which has been withdrawn at the predetermined angle, toward the front of a clerk; further withdrawing the bill storage unit, which has been rotated in the rotating step, toward the front of the clerk; and withdrawing the cassette from the bill storage unit.

FIGS. 9 to 13 show the procedure for withdrawing a cassette provided in the ATM of the present invention.

Figure 9:
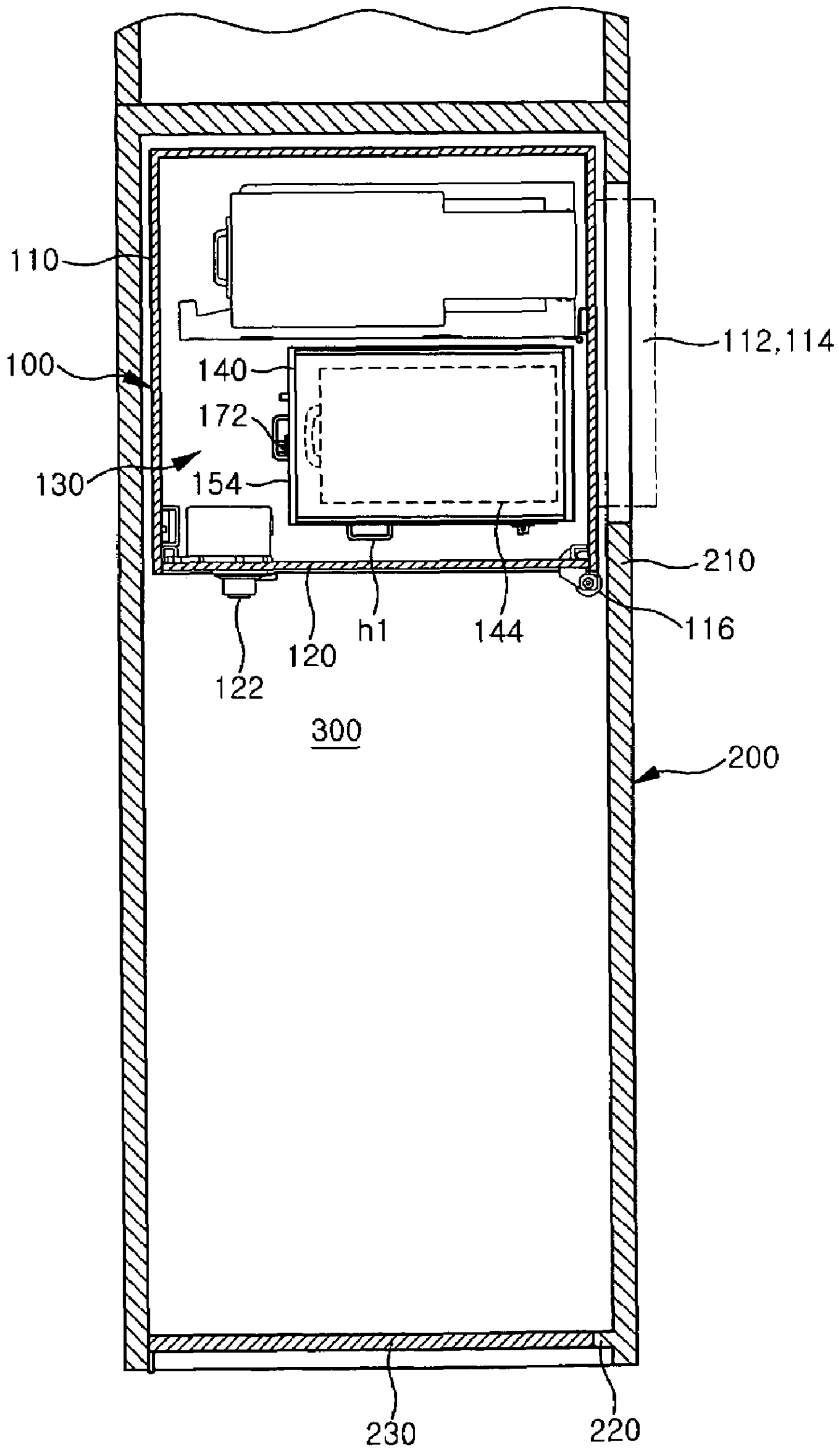
FIG. 9 is a plan view of a kiosk with the ATM installed therein.
Figure 10:
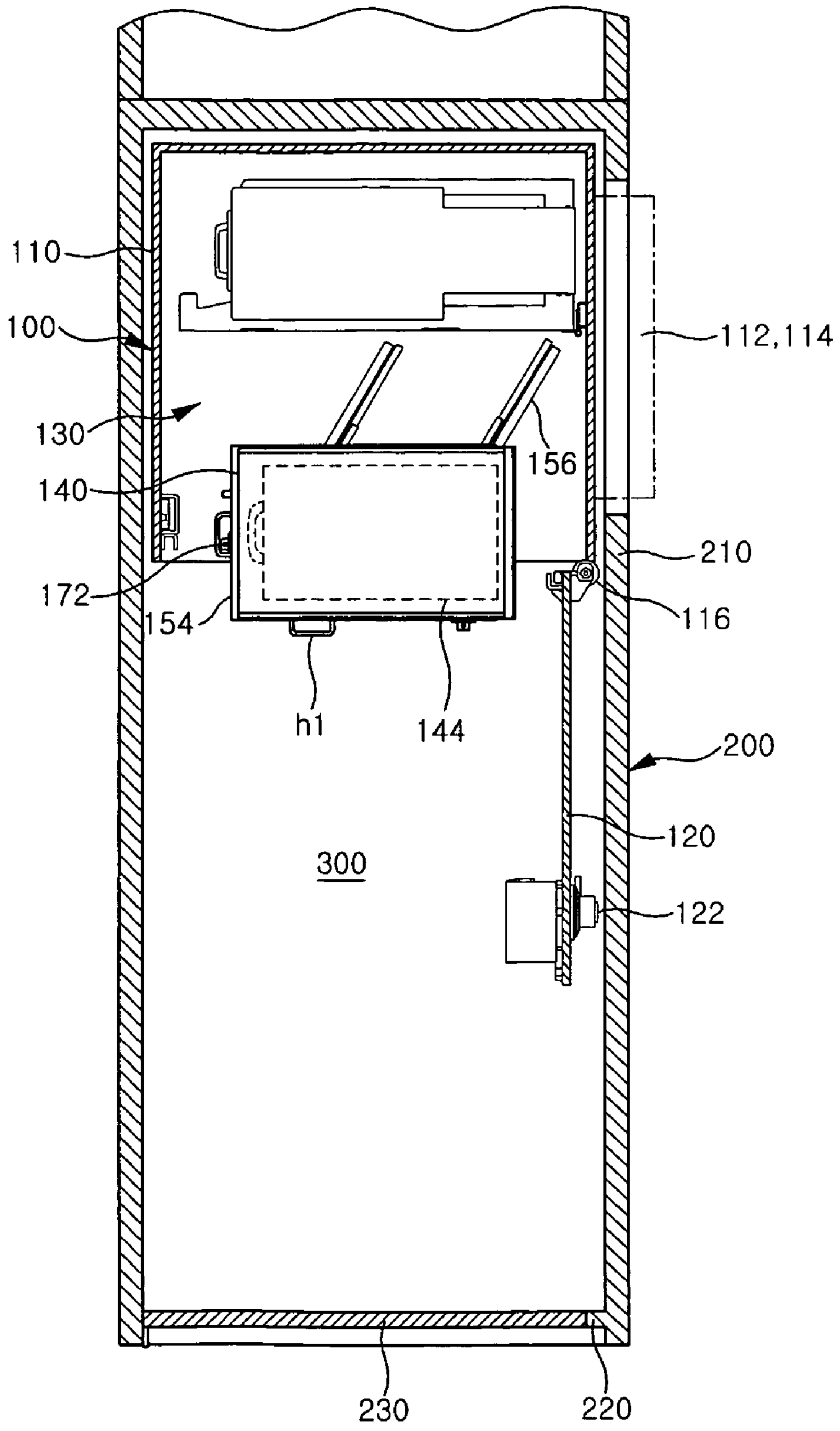
FIG. 10 is a plan view showing a state where the bill storage unit provided in the ATM is withdrawn along first guides.
Figure 11:
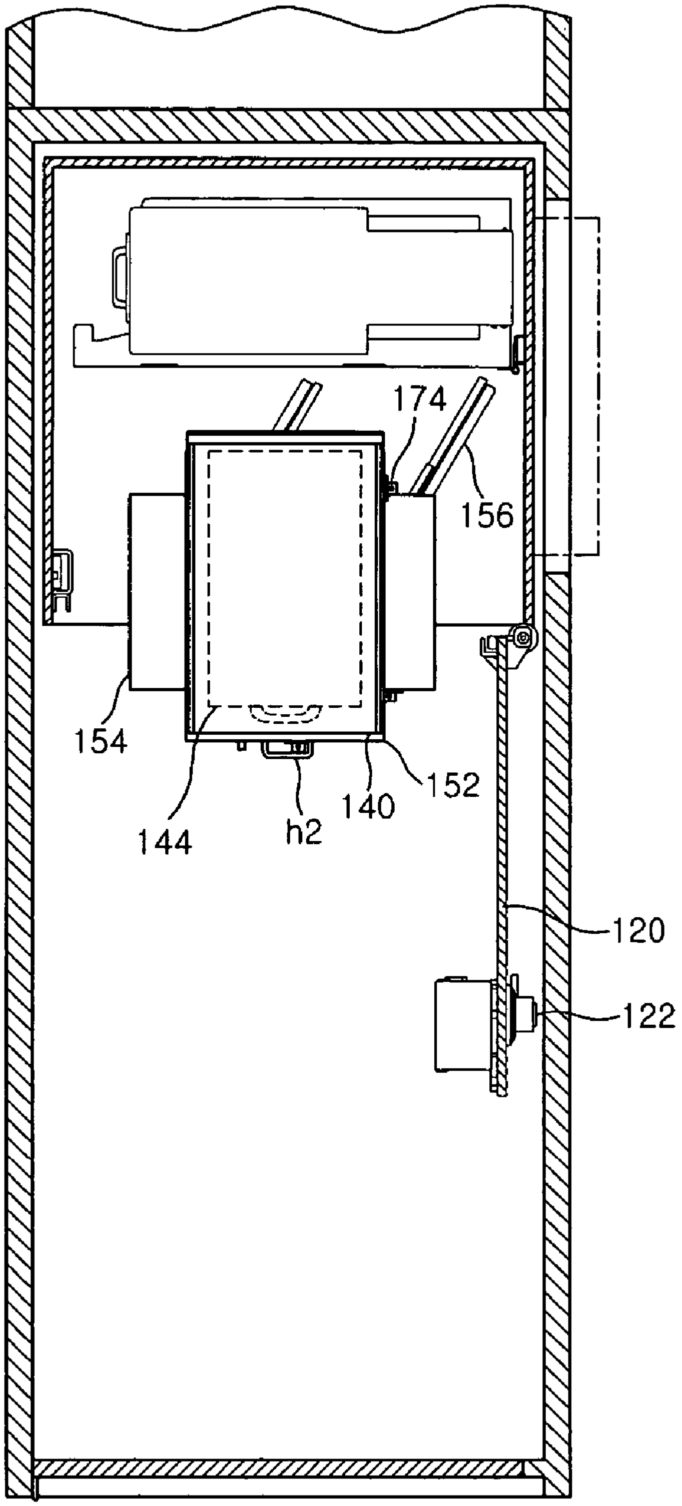
FIG. 11 is a plan view showing a state where the bill storage unit is rotated by 90 degrees by means of a rotary plate.
Figure 12:
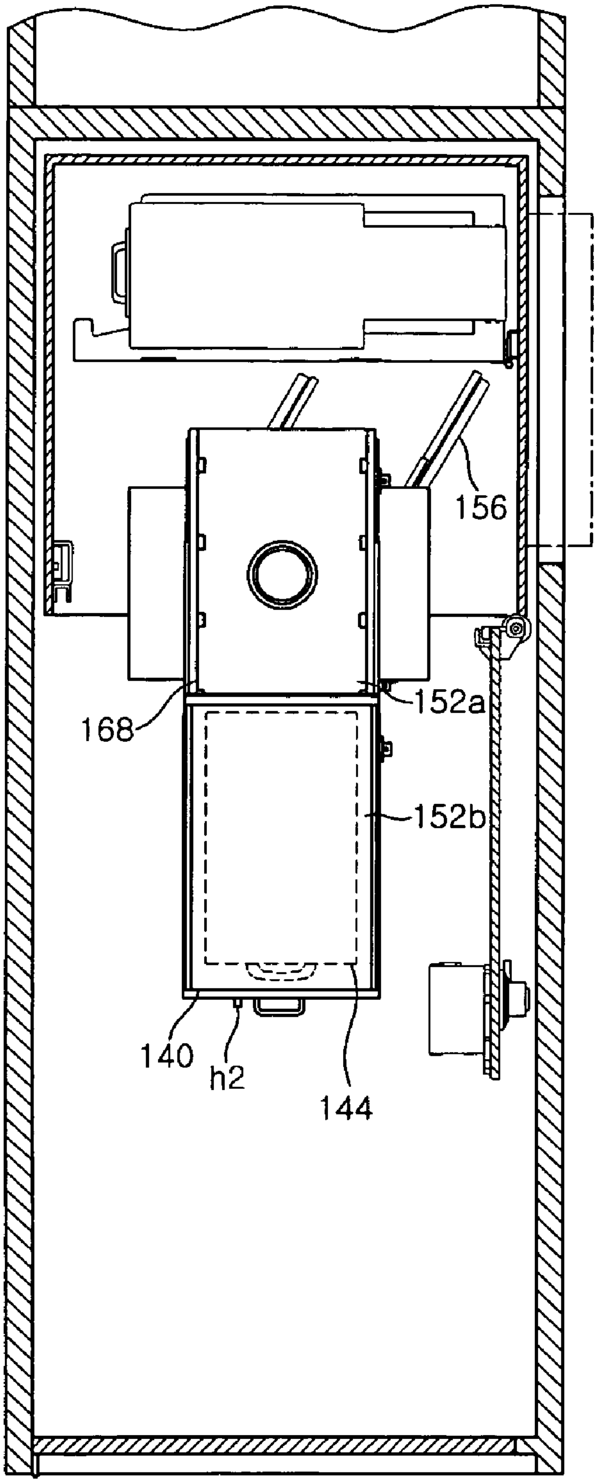
FIG. 12 is a plan view showing a state where the bill storage unit is further withdrawn along second guides.
Figure 13:
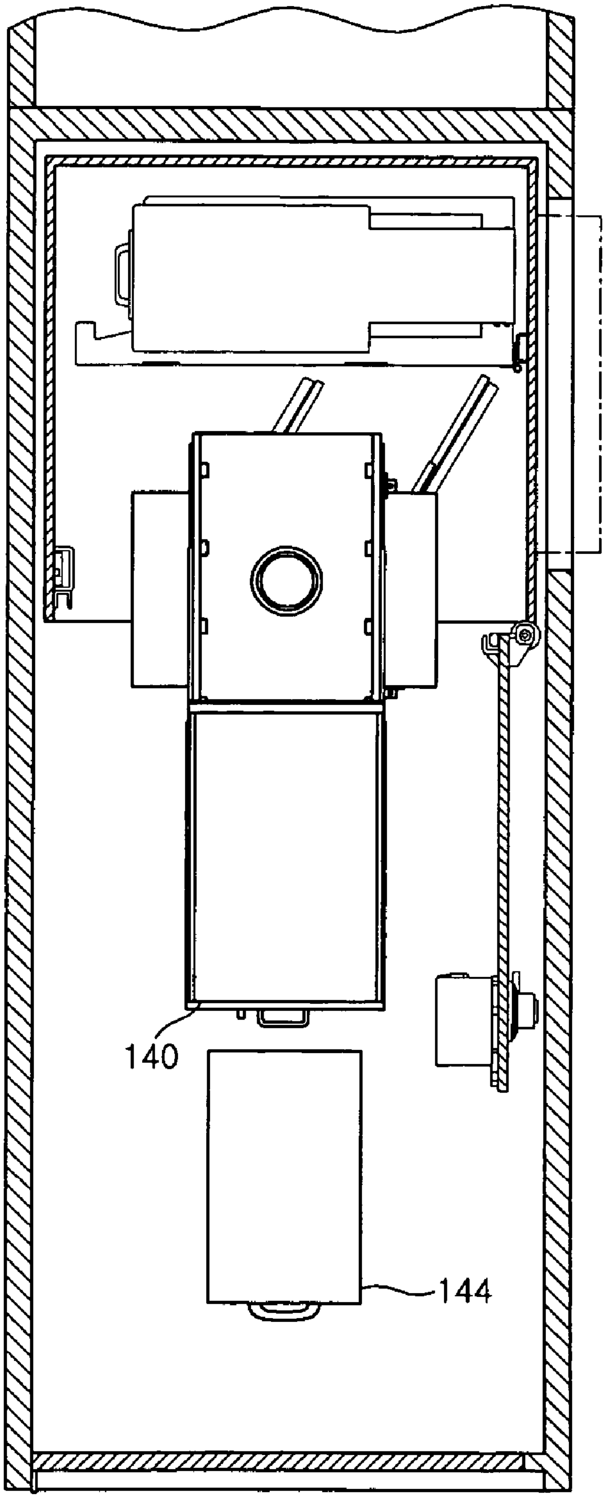
FIG. 13 is a plan view showing a state where a cassette mounted on the bill storage unit is separated therefrom.

FIG. 9 is a plan view of a kiosk with the ATM installed therein, and FIG. 10 is a plan view showing a state where the bill storage unit provided in the ATM is withdrawn along the first guides. Further, FIG. 11 is a plan view showing a state where the bill storage unit is rotated by 90 degrees by means of the rotary plate, FIG. 12 is a plan view showing a state where the bill storage unit is further withdrawn along the second guides; and FIG. 13 is a plan view showing a state where the cassette mounted on the bill storage unit is separated therefrom.

As illustrated in FIG. 9, the kiosk 200 installed at the roadside is constructed of a plurality of walls to form a desired space therein. The ATM 100 of the present invention is installed in the space, and a working space 300 is provided at one side of the ATM 100. At this time, the operation unit 112 and the cash deposit/withdrawal unit 114 of the ATM 100 are exposed to the outside of a front wall 210, which faces the road, among the walls of the kiosk 200. In a lateral wall, i.e., a lateral sidewall 220, perpendicular to the front wall 210 of the kiosk 200, an entrance 230 is formed to provide access to the working space 300. The entrance 230 is provided with a locking function for controlling the access to the working space 300.

In order to open the safe 130 of the ATM 100 installed within the kiosk 200, the safety door 120 formed in the lateral face of the main body 110 is opened. At this time, since the safety door 120 has the locking function 122, only a clerk can open and close the safety door 120. After the locking function 122 is released, the safety door 120 is pivoted on the hinge 116, thereby opening the safe 130 within the main body 110. After the safe 130 is opened and the first fixing member 172 mounted on the fixed plate 154 is released, the bill storage unit 140 is withdrawn using the handle h1 formed in the lateral face of the fixed plate 154. At this time, as shown in FIG. 10, the bill storage unit 140 is withdrawn at a predetermined angle. As previously mentioned, this is to prevent the occurrence of interference between the bill storage unit 140 and the front wall 210 of the kiosk 200.

Since the cassette 144 contained in the bill storage unit 140 was coupled thereto while being inserted from a rear side to a front side of the bill storage unit 140, the bill storage unit 140 should be turned toward the working space 300 in order to attach and detach the cassette 144. Therefore, after the bill storage unit 140 is withdrawn, the rotary plate 152 is rotated using the handle h2 formed in the rear face of the slider member 152*b*, as shown in FIG. 11. At this time, the second fixing member 174 should be released to enable the rotation of the rotary plate 152, and the rotary plate 152 is then rotated by 90 degrees such that the rear face of the bill storage unit 140 faces the front of the clerk.

Even when the rotary plate 152 has been rotated by 90 degrees, as described above, the cassette 144 can be withdrawn. In order for the clerk to easily perform his/her work, however, the third fixing member 176 mounted on the slider member 152*b* is released and the bill storage unit 140 can be then further withdrawn toward the front of the clerk, as shown in FIG. 12. At this time, the slider member 152*b* moves along the second guides 168.

Thereafter, as shown in FIG. 13, when the cassette 144 is separated from the bill storage unit 140, the work for withdrawing the cassette 144 is completed. Upon replacement of the cassette 144, its installation is performed in the order opposite to that of the withdrawing work. Thus, a detailed description thereof will be omitted.

As described above, in the automated-teller machine and the method of withdrawing the cassette contained in the automated-teller machine according to the present invention, since the cassette is withdrawn in the lateral direction of the automated-teller machine, works can be performed even in a kiosk with a space that is narrow in a fore and aft direction. Accordingly, there is an advantage in that a maintenance work for the automated-teller machine, particularly, a replacement work for the bill storage unit can be easily performed. In addition, since the kiosk has no portion protruding toward the outside, the maintenance work does not cause inconvenience to traveling cars or walkers.

Although the configuration and operation of the automated-teller machine and the method of withdrawing the cassette contained in the automated-teller machine according to the preferred embodiment of the present invention have been described and illustrated with reference to the accompanying drawings, it is only for illustrative purposes. It will be readily understood by those skilled in the art that various modifications and changes can be made thereto without departing from the spirit and scope of the present invention defined by the appended claims.

What is claimed is:

1. A financial automated-teller machine to be accommodated within a kiosk, comprising:

a main body having an operation unit and a cash deposit/withdrawal installed at a front face thereof;

a safety door having a locking function and hingedly connected to an edge of the front face of the main body;

a safe disposed within the main body, the safe being opened and closed by means of the safety door;

a bill storage unit with a bill-receiving and dispensing function for allowing a deposited bill to be received therein and a bill to be withdrawn to be dispensed therefrom; and a base having the bill storage unit mounted thereon, the base being placed within the safe when the safety door is closed, the base being capable of being withdrawn to the outside of the safe when the safety door is opened, the base being provided with a first guide at a lower portion thereof so that the base can be withdrawn along the first guide, wherein:

the first guide is installed at a predetermined angle with respect to the front face of the main body, and the base comprises a rotary plate connected to a bottom face of the bill storage unit and a fixed plate connected to an upper portion of the first guide, and the rotary plate is rotatably coupled to an upper portion of the fixed plate.

2. The automated-teller machine as claimed in claim 1, wherein the rotary plate comprises a rotary member rotatably disposed on the fixed plate and a slider member sliding over the rotary member along a second guide provided in a lateral face of the rotary member.

3. The automated-teller machine as claimed in claim 2, wherein the rotary plate and the fixed plate are coupled to each other by means of a bearing, and a roller is provided between the rotary plate and the fixed plate.

4. The automated-teller machine as claimed in claim 3, wherein the base is further provided with a handle so that the bill storage unit can be easily withdrawn.

5. The automated-teller machine as claimed in claim 3, wherein the roller is fixed to a bottom face of the rotary plate or a top face of the fixed plate, and a seating recess for receiving a portion of the roller therein is formed on a path of rotation of the roller.

6. The automated-teller machine as claimed in claim 5, wherein a plurality of rollers and seating recesses are formed to have the same angular intervals about a rotation axis of the bearing.

7. The automated-teller machine as claimed in claim 2, further comprising a fixing member for preventing the base from playing within the safe with the safety door closed.

8. The automated-teller machine as claimed in claim 7, wherein the fixing member comprises a first fixing member for preventing the play of the base, a second fixing member for preventing the play of the rotary plate, and a third fixing member for preventing the play of the slider member.

9. The automated-teller machine as claimed in claim 1, wherein the rotary plate and the fixed plate are coupled to each other by means of a bearing, and a roller is provided between the rotary plate and the fixed plate.

10. The automated-teller machine as claimed in claim 9, wherein the base is further provided with a handle so that the bill storage unit can be easily withdrawn.

11. The automated-teller machine as claimed in claim 9, wherein the roller is fixed to a bottom face of the rotary plate or a top face of the fixed plate, and a seating recess for receiving a portion of the roller therein is formed on a path of rotation of the roller.

12. The automated-teller machine as claimed in claim 11, wherein a plurality of rollers and seating recesses are formed to have the same angular intervals about a rotation axis of the bearing.

13. The automated-teller machine as claimed in claim 1, further comprising a fixing member for preventing the base from playing within the safe with the safety door closed.

14. The automated-teller machine as claimed in claim 13, wherein the fixing member comprises a first fixing member for preventing the play of the base, a second fixing member for preventing the play of the rotary plate, and a third fixing member for preventing the play of the slider member.

15. A financial automated-teller machine to be accommodated within a kiosk, comprising:

a main body having an operation unit and a cash deposit/withdrawal installed at a front face thereof;

a safety door having a locking function and hingedly connected to an edge of the front face of the main body;

a safe disposed within the main body, the safe being opened and closed by means of the safety door;

a bill storage unit with a bill-receiving and dispensing function for allowing a deposited bill to be received therein and a bill to be withdrawn to be dispensed therefrom; and a base having the bill storage unit mounted thereon, the base being placed within the safe when the safety door is closed, the base being capable of being withdrawn to the outside of the safe when the safety door is opened, the base being provided with a first guide at a lower portion thereof so that the base can be withdrawn along the first guide, a fixing member for preventing the base from playing within the safe with the safety door closed, wherein:

the first guide is installed at a predetermined angle with respect to the front face of the main body, and the fixing member comprises a first fixing member for preventing the play of the base, a second fixing member for preventing the play of the rotary plate, and a third fixing member for preventing the play of the slider member.

16. A method of withdrawing a cassette from an automated-teller machine, comprising the steps of:

opening a safety door to open a safe provided within a main body;

withdrawing a bill storage unit at a predetermined angle with respect to a front face of the main body, the bill storage unit including a plurality of cassettes and being accommodated in the safe;

rotating a handle of the bill storage unit, which has been withdrawn at the predetermined angle, toward the front of a clerk;

further withdrawing the bill storage unit, which has been rotated in the rotating step, toward the front of the clerk; and withdrawing the cassette from the bill storage unit.

* * * * *